United States Patent
Sundet (10) Patent No.: US 7,410,518 B2
(45) Date of Patent: Aug. 12, 2008

(54) FILTER REMOVAL DEVICES

(75) Inventor: Douglas C. Sundet, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 420 days.

(21) Appl. No.: 11/025,387

(22) Filed: Dec. 29, 2004

(65) Prior Publication Data

US 2006/0137311 A1    Jun. 29, 2006

(51) Int. Cl.
*B01D 46/00* (2006.01)

(52) U.S. Cl. .............................. 55/357; 55/481; 55/506; 55/495; 55/DIG. 31

(58) Field of Classification Search .................... 55/357, 55/385.1, 509, 495, 491, 506, DIG. 31; 190/124, 190/126, 107, 110; 454/291
See application file for complete search history.

(56) References Cited

U.S. PATENT DOCUMENTS

| | | | |
|---|---|---|---|
| 272,582 A * | 2/1883 | Provonchar ................... 55/357 |
| 1,746,283 A * | 2/1930 | Reed et al. ..................... 55/509 |
| 1,841,250 A * | 1/1932 | Merryweather ............... 96/347 |
| 2,016,033 A * | 10/1935 | Christofferson .............. 55/484 |
| 2,453,206 A * | 11/1948 | Donat .......................... 55/357 |
| 2,771,154 A * | 11/1956 | Gonzalez ..................... 55/357 |
| 2,992,701 A | 7/1961 | White |
| 3,075,334 A | 1/1963 | Nutting |
| 3,823,532 A * | 7/1974 | Cooper et al. ................. 55/357 |
| 4,052,318 A | 10/1977 | Krebs |
| 4,125,386 A * | 11/1978 | Philipp ........................ 55/493 |
| 4,247,316 A | 1/1981 | Putman |
| 4,394,147 A | 7/1983 | Caddy et al. |
| 4,438,057 A | 3/1984 | Sundseth |
| 5,024,760 A | 6/1991 | Kemper |
| 5,117,899 A * | 6/1992 | Skimehorn .................. 165/48.1 |
| 5,226,941 A | 7/1993 | Uibel et al. |
| 5,236,478 A | 8/1993 | Lewis et al. |
| 5,379,609 A | 1/1995 | Matsumoto et al. |
| 5,399,180 A | 3/1995 | Kopp |
| 5,618,419 A | 4/1997 | Fuerst |
| 5,645,146 A * | 7/1997 | Bieber et al. ............... 190/18 A |
| 5,702,493 A | 12/1997 | Everetts et al. |
| 5,746,794 A | 5/1998 | Hamm et al. |
| 5,766,285 A | 6/1998 | Killman |
| 5,989,421 A | 11/1999 | Davis et al. |
| 6,129,837 A | 10/2000 | Nurse, Jr. |
| 6,200,465 B1 * | 3/2001 | Carawan et al. ............... 210/94 |
| 6,235,195 B1 | 5/2001 | Tokar |
| 6,348,084 B1 | 2/2002 | Gieseke et al. |

(Continued)

FOREIGN PATENT DOCUMENTS

EP    0 453 657 A2    12/1990

(Continued)

*Primary Examiner*—Duane Smith
*Assistant Examiner*—Minh-Chau T. Pham
(74) *Attorney, Agent, or Firm*—Kenneth B. Wood (57) ABSTRACT

A device for facilitating removal of a filter from an air circulation system includes a flexible element having a first, low profile position adjacent a surface of the filter and a second, extended position spaced from the surface of the filter. When in the extended position the flexible element provides a graspable or grippable medium for removing the filter from the air circulation system. The device also includes attaching means for securing the flexible element to the filter.

19 Claims, 3 Drawing Sheets

U.S. PATENT DOCUMENTS

| | | |
|---|---|---|
| 6,387,156 B1 | 5/2002 | Richardson, Jr. et al. |
| 6,471,856 B1 | 10/2002 | Keith |
| 6,485,635 B1 | 11/2002 | Gandini et al. |
| 6,547,857 B2 | 4/2003 | Gieseke et al. |
| 6,551,383 B1 | 4/2003 | Richardson, Jr. et al. |
| 2002/0134720 A1 | 9/2002 | Bovington |
| 2005/0126872 A1* | 6/2005 | Dror .................... 190/107 |
| 2006/0150589 A1* | 7/2006 | Crow .................... 55/357 |
| 2006/0249344 A1* | 11/2006 | Ruby et al. ............. 190/126 |

FOREIGN PATENT DOCUMENTS

| | | |
|---|---|---|
| GB | 974353 | 4/1964 |
| JP | 2-290716 | 11/1990 |
| JP | 2002210319 A | 7/2002 |
| JP | 2003063123 A | 2/2003 |

\* cited by examiner

FILTER REMOVAL DEVICES

BACKGROUND OF THE INVENTION

The present invention relates generally to filters. More specifically, the present invention relates to a filter for filtering particulate contaminants from an air stream that includes a device for facilitating removal of the filter from the air stream.

Filters have been devised in the past to remove various particulate contaminants from a moving gas stream, and specifically for air streams. Such contaminants may, for example, include dust, lint, smoke, pollen, or dander. For instance, in conventional heating, ventilating, and air conditioning (HVAC) systems, a filter is inserted into the air stream to remove contaminants carried along in the air stream. The filtered air may then be recirculated throughout the HVAC system.

Conventional air filters generally include a filter media constructed from a porous material, such as open cell foam or a non-woven web of materials such as fiberglass. As a stream of air is induced to flow through the filter, particulate contaminants are entrapped or separated from the air stream and accumulated in the filter media. After a period of use in this manner, the accumulated contaminants begin to interfere with the flow of the air stream through the filter. The increased pressure drop across the filter impedes the airflow through the air filter and potentially reduces the effectiveness of the entire HVAC system. This requires that the air filter be removed and either cleaned or replaced with a new air filter.

An air filter is positioned in the air stream by inserting the filter into the ductwork of the HVAC system. A narrow support channel is typically provided in the HVAC system that is adapted to accommodate insertion of the air filter. When a user wishes to remove the filter from the support channel for cleaning or replacement, the user applies a force to the filter in a direction opposite of the insertion direction of the filter. Conventionally, this force is applied by grabbing or grasping edge portions of the filter and pulling the filter from the support channel. However, portions of the filter at times may become caught in the ductwork or the support channel upon installation, during use, or as the user tries to apply a removing force to the filter. This makes removal of the filter from the HVAC system difficult. In addition, the support channel is often just wide enough to accommodate the filter, which makes grasping or gripping a portion of the filter to apply a removing force to the filter cumbersome.

BRIEF SUMMARY OF THE INVENTION

The present invention is a device for facilitating removal of a filter from an air circulation system. The device includes a flexible element having a first, low profile position adjacent a surface of the filter and a second, extended position spaced from the surface of the filter. When in the extended position the flexible element provides a graspable or grippable medium for removing the filter from the air circulation system. The device also includes attaching means for securing the flexible element to the filter.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principals of this invention. The figures may not be drawn to scale. Like reference numbers have been used throughout the figures to denote like parts.

DETAILED DESCRIPTION

Figure 1:
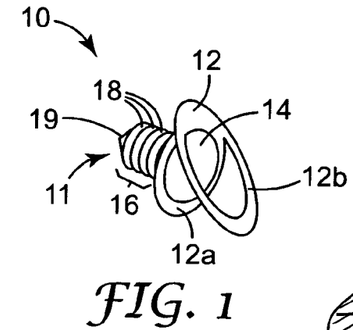
FIG. 1 is a perspective view of a device including a fastener and a pull ring for facilitating removal of a filter from an air circulation system.

FIG. 1 is a perspective view of device 10 including fastener 11 and pull ring 12 for facilitating removal of a filter from an air circulation system. Fastener 11 includes head 14 and insertion portion 16. Insertion portion 16 includes a plurality of resilient ribs 18 and terminates in tip 19. Head 14 and insertion portion 16 are formed integrally with each other. In one embodiment, fastener 11 is formed of a polymeric material, such as nylon, polyurethane, polyethylene, polypropylene, polyester, polyamide, an ionomer, or the like. Fastener 11 as shown in FIG. 1 is commonly referred to as a CHRISTMAS TREE™ clip, which is manufactured and sold by ITW Fastex, inc., Des Plaines, IL.

Pull ring 12 is formed of a flexible material and includes ring-shaped mounting portion 12a and extendable portion 12b. Mounting portion 12a and extendable portion 12b are formed integrally with each other. In one embodiment, pull ring 12 is die-cut from a polymeric material, such as nylon, polyurethane, polyethylene, polypropylene, polyester, polyamide, an ionomer, or the like.

Fastener 11 and pull ring 12 are assembled to produce device 10. In particular, insertion portion 16 of fastener 11 is passed through pull ring 12 such that head 14 of fastener 11 is seated against ring-shaped mounting portion 12a of pull ring 12. Head 14 is shaped such that the diameter of head 14 is larger than the inner diameter of ring-shaped mounting portion 12a of pull ring 12. This prevents head 14 from passing through mounting portion 12a when pull ring 12 is engaged with fastener 11.

Figure 2:
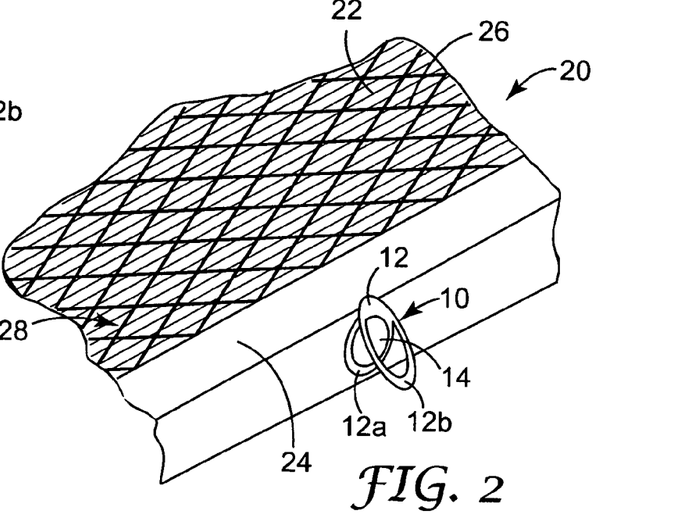
FIG. 2 is a perspective view of the device shown in FIG. 1 secured to a filter according to an embodiment of the present invention, showing the pull ring in an extended position relative to the filter.

FIG. 2 is a perspective view of device 10 secured to filter 20 according to an embodiment of the present invention. Filter 20 includes filter media 22, filter frame 24, and media support lattice 26. Filter media 22 includes first major surface 28 and a second major surface on a side opposite of filter 20 from first major surface 28 (not shown in FIG. 2). Filter media 22 may be composed of any suitable material that may be utilized to filter particulate contaminants from an air stream.

Filter media 22 is a sheet-like member supported by filter frame 24 to which a periphery of filter media 22 is secured. For example, filter frame 24 may have generally u-shaped peripheral cross-section (not shown) for receipt of the periphery of filter media 22. Any suitable material may be used for filter frame 24. For example, filter frame 24 may be made of cardboard, pasteboard, or plastic. Filter media 22 is then secured to filter frame 24, such as mechanically or by a suitable adhesive. Filter 20 also optionally includes support lattice 26 that is positioned adjacent to one or both of first major surface 28 and the second major surface. Support lattice 26 acts to maintain filter media 22 in position relative to filter frame 24, and to reinforce the filter media against the force of the airflow passing through filter media 22.

Device 10 is secured to filter frame 24 by passing insertion portion 16 through a preformed aperture in filter frame 24. Alternatively, if filter frame 24 is made of a readily penetrable material such as cardboard or pasteboard, device 10 may be secured to filter frame 24 by forcing tip 19 through filter frame 24 to create an aperture. As insertion portion 16 is passed through filter frame 24, resilient ribs 18 deflect to fit through either the preformed aperture or the aperture created by forcing tip 19 through filter frame 24. After each rib 18 passes through filter frame 24, it returns to its relaxed state. When each rib 18 returns to its relaxed state, it mechanically secures device 10 to filter frame 24 because ribs 18 in a relaxed state are wider than the aperture. This prevents device 10 from being pulled from filter frame 24. Insertion portion 16 is passed through filter frame 24 until head 14 and mounting portion 12a of pull ring 12 are seated against filter frame 24.

When filter 20 is installed in an air circulation system, filter 20 is displaced in a support channel that is adapted to accommodate filter 20. However, this channel is typically rather narrow and there is typically limited space around filter 20 in the support channel. Thus, it is desirable for device 10 to have a minimal elevation relative to filter frame 24 to prevent device 10 from interfering with installation of filter 20 in the support channel and with surrounding structures in the air circulation system. To accomplish this, extendable portion 12b of pull ring 12 is urgable against filter frame 24. When extendable portion 12b is urged against filter frame 24, the inner diameter of extendable portion 12b surrounds the outer diameter of mounting portion 12a such that pull ring 12 is displaced substantially flat against filter frame 24. In one embodiment, head 14 of fastener 11 has a substantially flat outwardly facing surface. Thus, device 10 sits substantially flat against filter frame 24 when filter 20 is installed in an air circulation system.

When a user wishes to remove filter 20 from the air circulation system for cleaning or replacement, the user applies a force to filter 20 in a direction opposite of the insertion direction of the filter 20. To accomplish this, the user first extends extendable portion 12b of pull ring 12 from filter frame 24 (as shown in FIG. 2). The user then grasps pull ring 12 or inserts a finger into and pulls on pull ring 12. As the user pulls pull ring 12, ribs 18 of insertion portion 16 are forced against an interior surface of filter frame 24. This causes a force to be applied to filter 20 in the direction in which pull ring 12 is pulled. The user pulls pull ring 12 with a force sufficient enough to remove filter 20 from the air circulation system. When filter 20 has been removed from the air circulation system it may be cleaned, filter media 22 may be replaced, or filter 20 may be replaced with a new filter.

Figures 3, 4:
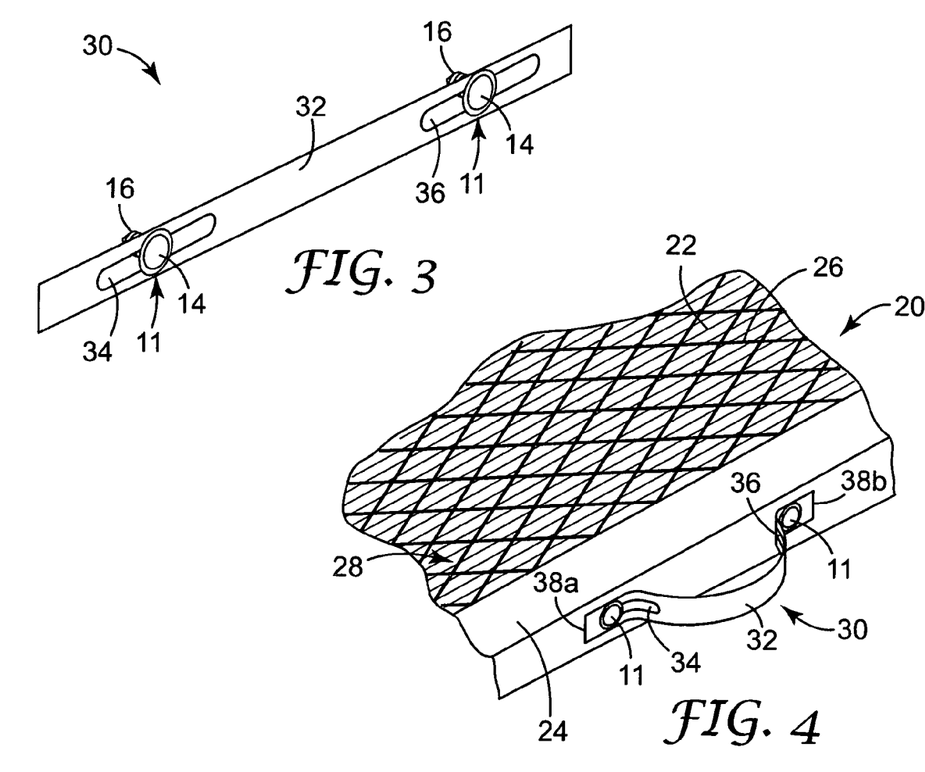
FIG. 3 is a perspective view of a strip handle including fasteners for facilitating removal of a filter from an air circulation system.
FIG. 4 is a perspective view of the strip handle shown in FIG. 3 secured to a filter according to an embodiment of the present invention, showing the strip handle in an extended position relative to the filter.

FIG. 3 is a perspective view of a device 30 including strip handle 32 for facilitating removal of a filter from an air circulation system. Strip handle 30 includes slots 34 and 36. Slots 34 and 36 are adapted to receive a device for securing strip handle 32 to a filter (e.g., fastener 11). In one embodiment, strip handle 32 is formed of a flexible polymeric material, such as nylon, polyurethane, polyethylene, polypropylene, polyester, polyamide, an ionomer, or the like.

Fasteners 11 are passed through slots 32 and 34 to produce device 30. In particular, insertion portion 16 of one fastener 11 is passed through slot 34 and insertion portion 16 of another fastener 11 is passed through slot 36 such that head 14 of each fastener 11 is seated against strip handle 32. Slots 34 and 36 are shaped such that the diameter of head 14 is larger than the width of slots 34 and 36. This prevents head 14 from passing through slots 34 and 36 when fasteners 11 are engaged with strip handle 32.

FIG. 4 is a perspective view of the strip handle 30 secured to filter 20 with fasteners 11 according to another embodiment of the present invention. Device 30 is secured to filter frame 24 by passing insertion portion 16 of each fastener 11 through a preformed aperture in filter frame 24. Alternatively, if filter frame 24 is made of a readily penetrable material such as cardboard or pasteboard, device 30 may be secured to filter frame 24 by forcing tip 19 (FIG. 1) through filter frame 24 to create an aperture. As insertion portion 16 is passed through filter frame 24, resilient ribs 18 (FIG. 1) deflect to fit through either the preformed aperture or the aperture created by forcing tip 19 through filter frame 24. After each rib 18 passes through filter frame 24, it returns to its relaxed state. When each rib 18 returns to its relaxed state, it mechanically secures device 30 to filter frame 24 because ribs 18 in a relaxed state are wider than the aperture. This prevents device 30 from being pulled from filter frame 24. Insertion portion 16 of each fastener 11 is passed through filter frame 24 until head 14 and strip handle 32 are adjacent to filter frame 24.

When filter 20 is installed in an air circulation system, filter 20 is displaced in a support channel that is adapted to accommodate filter 20. However, this channel is typically rather narrow and there is typically limited space around filter 20 in the support channel. Thus, it is desirable for device 30 to have a minimal elevation relative to filter frame 24 to prevent device 30 from interfering with installation of filter 20 in the support channel and with surrounding structures in the air circulation system. To accomplish this, strip handle 32 is urgable against filter frame 24 by causing slots 34 and 36 to slide relative to insertion portion 16 of each fastener 11. This causes ends 38a and 38b of strip handle 32 to slide along filter frame 24 in opposite directions to each other. Strip handle 32 is urged against filter frame 24 until strip handle 32 is displaced substantially flat against filter frame 24. In one embodiment, head 14 of fastener 11 has a substantially flat outwardly facing surface. Thus, device 30 sits substantially flat against filter frame 24 when filter 20 is installed in an air circulation system.

When a user wishes to remove filter 20 from the air circulation system for cleaning or replacement, the user applies a force to filter 20 in a direction opposite of the insertion direction of the filter 20. To accomplish this, the user first pulls strip handle 32 away from filter frame 24 until fasteners 11 are urged against the ends of slots 34 and 36 nearest strip handle ends 38a and 38b, respectively (as shown in FIG. 4). This provides a graspable or grippable medium by which the user can pull device 30 relative to filter frame 24. As the user pulls strip handle 32, ribs 18 of insertion portion 16 of each fastener 11 are forced against an interior surface of filter frame 24. This causes a force to be applied to filter 20 in the direction in which strip handle 32 is pulled. The user pulls strip handle 32 with a force sufficient enough to remove filter 20 from the air circulation system. When filter 20 has been removed from the air circulation system it may be cleaned, filter media 22 may be replaced, or filter 20 may be replaced with a new filter.

Figure 5:
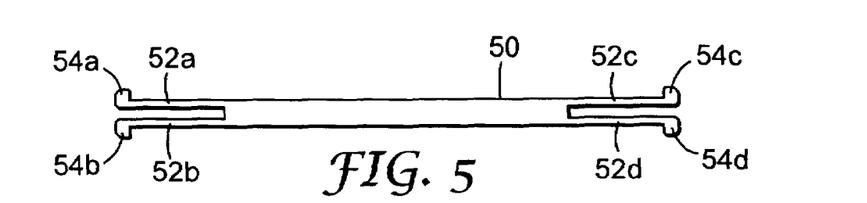
FIG. 5 is a perspective view of a handle for facilitating removal of a filter from an air circulation system.

FIG. 5 is a perspective view of locking slot handle 50 for facilitating removal of a filter from an air circulation system. Handle 50 includes resilient tines 52a and 52b on one end of handle 50 and resilient tines 52c and 52d on the opposite end of handle 50. Resilient tines 52a, 52b, 52c, and 52d include locking tabs 54a, 54b, 54c, and 54d on their respective ends. In one embodiment, handle 50 is formed of a resilient polymeric material, such as nylon, polyurethane, polyethylene, polypropylene, polyester, polyamide, an ionomer, or the like.

Figure 6:
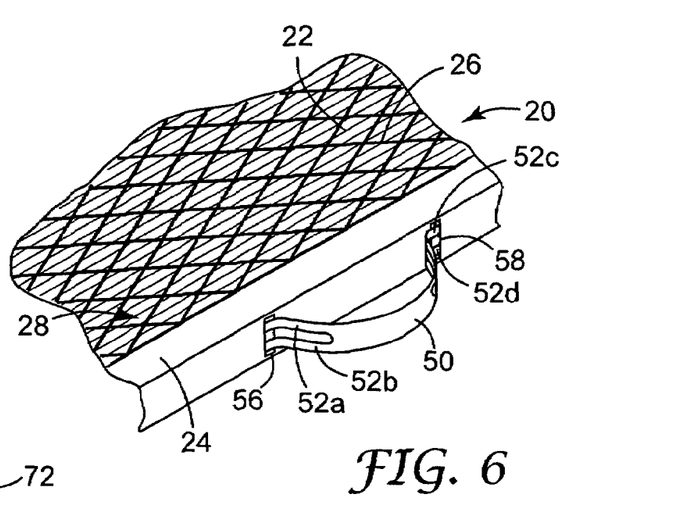
FIG. 6 is a perspective view of the handle shown in FIG. 5 secured to a filter according to an embodiment of the present invention, showing the handle in an extended position relative to the filter.

FIG. 6 is a perspective view of handle 50 secured to filter 20 according to another embodiment of the present invention. Handle 50 is secured to filter frame 24 by inserting locking tabs 54a and 54b through preformed slot 56 in filter frame 24 and by inserting locking tabs 54c and 54d through preformed slot 58 in filter frame 24. To insert locking tabs 54a and 54b into slot 56, resilient tines 52a and 52b are first urged toward each other to force locking tabs 54a and 54b adjacent to each other. Locking tabs 54a and 54b are then inserted into slot 56. When locking tabs 54a and 54b have been inserted into slot 56, resilient tines 52a and 52b are permitted to return to their relaxed state. When resilient tines 52a and 52b are in their relaxed state, locking tabs 54a and 54b prevent handle 50 from becoming disengaged from slot 56. A similar procedure is then used to insert locking tabs 54c and 54d into slot 58 to fully engage handle 50 with filter 20.

When filter 20 is installed in an air circulation system, filter 20 is displaced in a support channel that is adapted to accommodate filter 20. However, this channel is typically rather narrow and there is typically limited space around filter 20 in the support channel. Thus, it is desirable for handle 50 to have a minimal elevation relative to filter frame 24 to prevent handle 50 from interfering with installation of filter 20 in the support channel and with surrounding structures in the air circulation system. To accomplish this, handle 50 is urgable against filter frame 24 by causing resilient tines 52a and 52b to slide into slot 56 and by causing resilient tines 52c and 52d to slide into slot 58. Handle 50 is urged against filter frame 24 until handle 50 is displaced substantially flat against filter frame 24.

When a user wishes to remove filter 20 from the air circulation system for cleaning or replacement, the user applies a force to filter 20 in a direction opposite of the insertion direction of the filter 20. To accomplish this, the user first pulls handle 50 away from filter frame 24, thereby pulling resilient tines 52a and 52b from slot 56 and resilient tines 52c and 52d from slot 58 (as shown in FIG. 6). This provides a graspable or grippable medium by which the user can pull handle 50 relative to filter frame 24. As the user pulls handle 50, locking tabs 54a and 54b are urged against slot 56 and locking tabs 54c and 54d are urged against slot 58. This causes a force to be applied to filter 20 in the direction in which handle 50 is pulled. The user pulls handle 50 with a force sufficient enough to remove filter 20 from the air circulation system. When filter 20 has been removed from the air circulation system it may be cleaned, filter media 22 may be replaced, or filter 20 may be replaced with a new filter.

Figure 7:
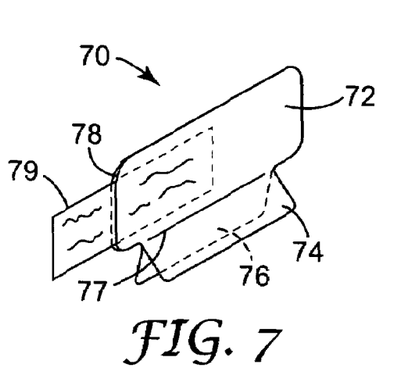
FIG. 7 is a perspective view of a foldable tab for facilitating removal of a filter from an air circulation system.

FIG. 7 is a perspective view of foldable tab 70 (such as a file folder index tab) for facilitating removal of a filter from an air circulation system. In one embodiment, foldable tab 70 is formed of a resilient polymeric material, such as nylon, polyurethane, polyethylene, polypropylene, polyester, polyamide, an ionomer, or the like. Foldable tab 70 as shown in FIG. 7 is manufactured and sold by Avery-Dennison Corporation, Pasadena, Calif. Foldable tab 70 includes tab portion 72, first securing panel 74, and second securing panel 76. Tab portion 72, first securing panel 74, and second securing panel 76 are formed integrally with each other and are connected at foldable region 77. Tab portion 76 includes a slot 78 for insertion of optional writable or printable insert 79. Writable or printable insert 79 may be written or printed on to include, for example, the date of installation of the filter, the target date of removal of the filter, and any other useful information about the filter.

Figure 8:
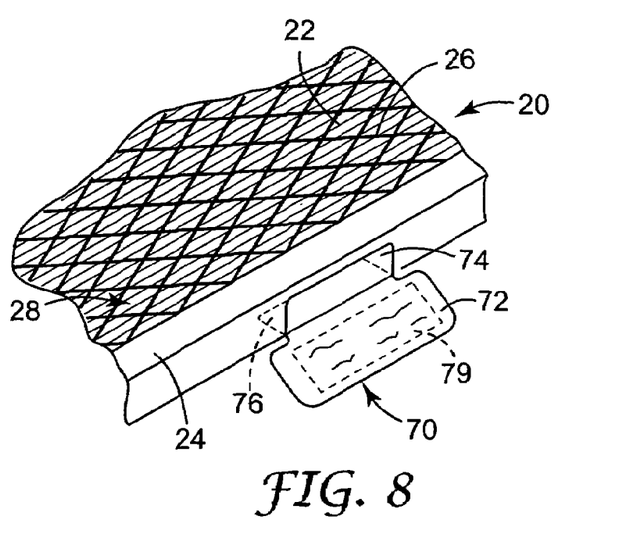
FIG. 8 is a perspective view of the foldable tab shown in FIG. 7 secured to a filter according to an embodiment of the present invention, showing the tab in an extended position relative to the filter.

FIG. 8 is a perspective view of foldable tab 70 secured to filter 20 according to another embodiment of the present invention. Foldable tab 70 is secured to filter frame 24 by adhering surfaces of securing panels 74 and 76 to filter frame 24. In particular, first securing panel 74 is adhered to a side of filter frame 24 oriented transversely to first major surface 28 and the second major surface of filter media 22 (peel mode), and second securing panel 76 is adhered to a side of filter frame 24 oriented parallel to first major surface 28 and the second major surface of filter media 22 (shear mode). In an alternative embodiment, foldable tab 70 may be provided with a single securing panel to provide shear mode adhesion only.

When filter 20 is installed in an air circulation system, filter 20 is displaced in a support channel that is adapted to accommodate filter 20. However, this channel is typically rather narrow and there is typically limited space around filter 20 in the support channel. Thus, it is desirable for foldable tab 70 to have a minimal elevation relative to filter frame 24 to prevent foldable tab 70 from interfering with installation of filter 20 in the support channel and with surrounding structures in the air circulation system. To accomplish this, tab portion 72 is urgable against filter frame 24 by bending or folding foldable tab 70 along foldable region 77. Tab portion 72 may either be urged toward a side of filter frame 24 oriented either transversely or parallel to first major surface 28 and the second major surface of filter media 22. Tab portion 72 is urged against filter frame 24 until tab portion 72 is displaced substantially flat against filter frame 24.

When a user wishes to remove filter 20 from the air circulation system for cleaning or replacement, the user applies a force to filter 20 in a direction opposite of the insertion direction of the filter 20. To accomplish this, the user first pulls tab portion 72 away from filter frame 24. This provides a graspable or grippable medium by which the user can pull foldable tab 70 relative to filter frame 24. As the user pulls foldable tab 70, the user pulls against the adhering force of the adhesive on securing panels 74 and 76. As a result, a force is applied to filter 20 in the direction in which foldable tab 70 is pulled. The user pulls foldable tab 70 with a force sufficient enough to remove filter 20 from the air circulation system. When filter 20 has been removed from the air circulation system it may be cleaned, filter media 22 may be replaced, or filter 20 may be replaced with a new filter.

Figure 9:
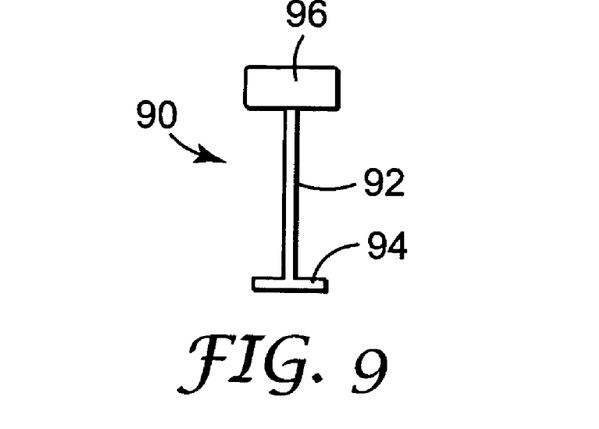
FIG. 9 is a plan view of a tag fastener for facilitating removal of a filter from an air circulation system.

FIG. 9 is a front view of tag fastener 90 for facilitating removal of a filter from an air circulation system. Tag fastener 90 is one of a variety of fasteners sold under the trade name SWIFTACH® by Avery-Dennison Corporation, Pasadena, CA. Tag fastener 90 includes elongated connecting member 92, end bar 94, and paddle 96. End bar 94 is coupled to elongated member 92 at one end, and paddle 96 is coupled to elongated member 92 at an end opposite end bar 94. In one embodiment, elongated member 92, end bar 94, and paddle 96 are made a polymeric material, such as nylon, polyurethane, polyethylene, polypropylene, polyester, polyamide, an ionomer, or the like.

Figure 10:
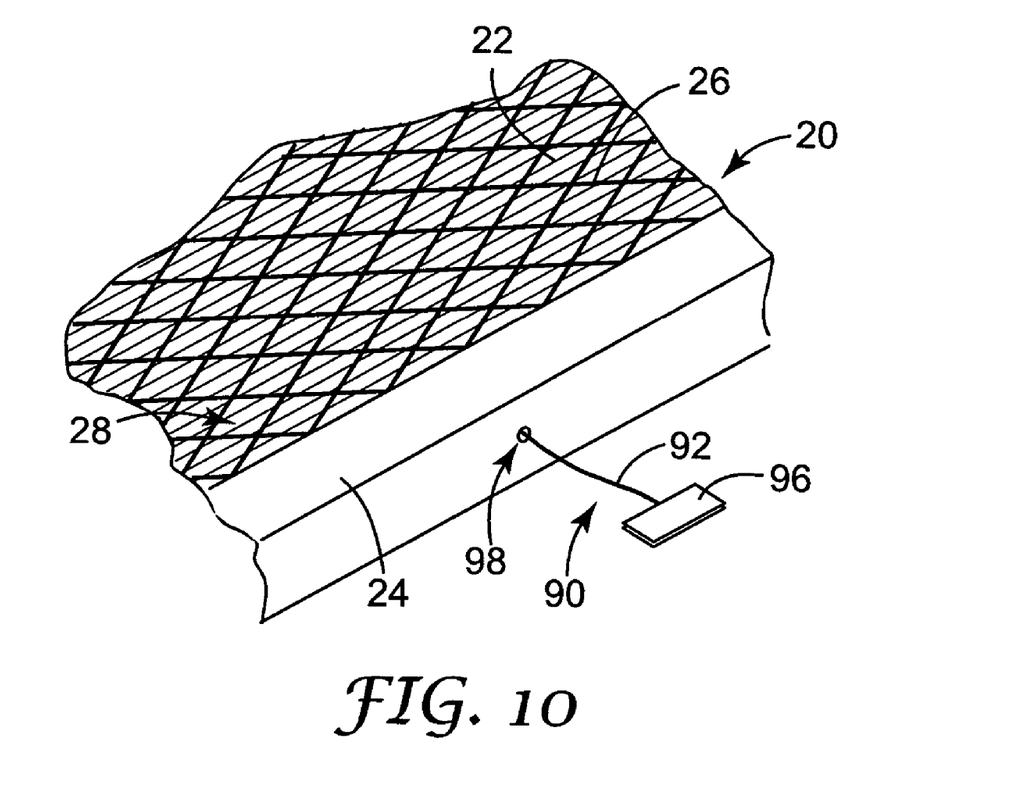
FIG. 10 is a perspective view of the tag fastener shown in FIG. 9 secured to a filter according to an embodiment of the present invention, showing the tag fastener in an extended position relative to the filter.

FIG. 10 is a perspective view of tag fastener 90 secured to filter 20 according to another embodiment of the present invention. Tag fastener 90 is secured to filter frame 24 by passing end bar 94 through aperture 98 in filter frame 24. Alternatively, tag fastener 90 may be secured to filter frame 24 using a hand-held apparatus commonly referred to as a tagging gun, which creates an aperture 98 in filter frame 24 for attaching tag fastener 90. An example of a tagging gun is disclosed in U.S. Pat. No. 4,955,475 entitled "Continuous Fastener Stock" by McCarthy et al., assigned to Dennison Manufacturing Company, Framingham, Mass., which is hereby incorporated by reference. When end bar 94 has been passed through aperture 98, end bar 94 is oriented such that end bar 94 is substantially parallel to the side of filter frame 24 to which it is attached.

When filter 20 is installed in an air circulation system, filter 20 is displaced in a support channel that is adapted to accommodate filter 20. However, this channel is typically rather narrow and there is typically limited space around filter 20 in the support channel. Thus, it is desirable for tag fastener 90 to have a minimal elevation relative to filter frame 24 to prevent tag fastener 90 from interfering with installation of filter 20 in the support channel and with surrounding structures in the air circulation system. To accomplish this, paddle 96 is urgable against filter frame 24 by passing elongated portion 92 through aperture 98 until paddle 96 is displaced substantially flat against filter frame 24.

When a user wishes to remove filter 20 from the air circulation system for cleaning or replacement, the user applies a force to filter 20 in a direction opposite of the insertion direction of the filter 20. To accomplish this, the user grabs or grasps paddle 96 and pulls paddle 96 away from filter frame 24. As the user pulls paddle 96, end bar 94 is urged against an interior surface of filter frame 24. This causes a force to be applied to filter 20 in the direction in which paddle 96 is pulled. The user pulls paddle 96 with a force sufficient enough to remove filter 20 from the air circulation system. When filter 20 has been removed from the air circulation system it may be cleaned, filter media 22 may be replaced, or filter 20 may be replaced with a new filter.

Various modifications to the filter removal devices and uses therefor that have been described may be made without departing from the spirit and scope of the present invention. For example, while the filter removal devices have been shown secured to a side of filter frame 24 oriented transversely to the major surfaces of filter media 22, the filter removal devices may also be secured to a side of filter frame 24 oriented parallel to the major surfaces of filter media 22. In essence, the filter removal devices are attachable to any side of filter frame 24 that best facilitates removal of filter 20 from an air circulation system. Also, multiple filter removal devices (of like or different kind) may be mounted along filter frame 24 to provide additional grasping or gripping points for a user to pull filter 20 from the air circulation system. In addition, while the filter removal devices described have been shown attached to filter frame 24, the filter removal devices may alternatively be secured to any portion of filter 20 that does not interfere with the operation or installation of the filter. Furthermore, besides facilitating removal of filter 20 from an air circulation system, the filter removal devices described may also be employed as a carrying mechanism during transportation of filter 20.

In summary, when a user wishes to remove the filter from the support channel of an air circulation system for cleaning or replacement, the user applies a force to the filter in a direction opposite of the insertion direction of the filter. Conventionally, this force is applied by grabbing or grasping edge portions of the filter and pulling the filter from the support channel. However, portions of the filter at times may become caught in the ductwork or the support channel upon installation, during use, or as the user tries to apply a removing force to the filter. In addition, the support channel is often just wide enough to accommodate the filter, which makes grasping or gripping a portion of the filter to apply a removing force to the filter cumbersome. The present invention relates to a device for facilitating removal of a filter that addresses these and other issues. The device includes a flexible element which is urgable against the filter when the filter is disposed in the air circulation system and which is extendable from the filter to provide a graspable or grippable medium for removing the filter from the air circulation system. The device also includes attaching means for securing the flexible element to a portion of the filter.

Although the present invention has been described with reference to preferred embodiments, workers skilled in the art will recognize that changes may be made in form and detail without departing from the spirit and scope of the invention.

The invention claimed is:

1. A device for facilitating removal of a filter from an air circulation system, the filter including a filter frame and a filter media disposed within and attached to the filter frame, the filter media having a first major surface and a second major surface, and the filter frame having at least a surface that is oriented transversely to the major surfaces of the filter media, the device comprising:
a flexible element having a first, low profile position flat against the surface of the filter frame that is oriented transversely to the major surfaces of the filter media, and a second, extended position spaced from the transversely-oriented surface of the filter frame, wherein when in the extended position the flexible element provides a graspable or grippable medium for removing the filter from the air circulation system; and
attaching means for securing the flexible element to the filter.

2. The device of claim 1, wherein the flexible element is ring-shaped and adapted to receive a finger.

3. The device of claim 1, wherein the flexible element comprises a handle.

4. The device of claim 1, wherein the flexible element comprises a foldable tab including a slot adapted for receiving a writable article.

5. The device of claim 1, wherein the flexible element comprises a polymeric material.

6. The device of claim 1, wherein the attaching means comprises a fastener including a plurality of resilient ribs which extend through an aperture in the filter.

7. The device of claim 1, wherein the attaching means comprises an end bar of a tag fastener.

8. The device of claim 1, wherein the attaching means comprises an adhesive material.

9. An assembly comprising:
a filter frame;
a filter media disposed within and attached to the filter frame for filtering particulate contaminants from an air stream, the filter media having a first major surface and a second major surface for air flow through the filter media from the first major surface to the second major surface and the filter frame having at least a surface that is oriented transversely to the major surfaces of the filter media; and a device secured to the filter frame which is urgable substantially flat against the filter frame surface that is oriented transversely to the major surfaces of the filter media when the filter is disposed in the air stream and which is extendable from the transversely-oriented filter frame surface to provide a graspable or grippable medium to facilitate removal of the filter from the air stream.

10. The assembly of claim 8, wherein the flexible element is ring-shaped and adapted to receive a finger.

11. The assembly of claim 8, wherein the flexible element comprises a handle.

12. The assembly of claim 8, wherein the flexible element comprises a foldable tab including a slot adapted for receiving a writable article.

13. The assembly of claim 8, wherein the flexible element comprises a polymeric material.

14. The assembly of claim 8, and further comprising:

a lattice adjacent at least one of the first and second major surfaces of the filter media for supporting the filter media.

15. A device for facilitating removal of a filter from an air circulation system, the filter including a filter frame and a filter media disposed within and attached to the filter frame, the filter media having a first major surface and a second major surface, and the filter frame having at least a surface that is oriented transversely to the major surfaces of the filter media, the device attachable to the filter frame and comprising:

a flexible element which is positionable substantially flat against the surface of the filter frame that is oriented transversely to the major surfaces of the filter media when the filter is disposed in the air circulation system and which is extendable from the transversely-oriented filter frame surface to provide a grippable medium for pulling the filter from the air circulation system.

16. The device of claim 15, wherein the flexible element is ring-shaped and adapted to receive a finger.

17. The device of claim 15, wherein the flexible element comprises a handle.

18. The device of claim 15, wherein the flexible element comprises a foldable tab including a slot adapted for receiving a writable article.

19. The device of claim 15, wherein the flexible element comprises a polymeric material.

\* \* \* \* \*

UNITED STATES PATENT AND TRADEMARK OFFICE
CERTIFICATE OF CORRECTION

PATENT NO. : 7,410,518 B2  
APPLICATION NO. : 11/025387  
DATED : August 12, 2008  
INVENTOR(S) : Douglas C. Sundet Page 1 of 1

It is certified that error appears in the above-identified patent and that said Letters Patent is hereby corrected as shown below:

Title Page 2, Column 2  
Item [56] References Cited, under Foreign Patent Documents, Delete "2003063123" and insert -- 2003053123 --, therefor.

Column 7  
Line 3, delete "polyamnide" and insert -- polyamide --, therefor.

Signed and Sealed this

Twelfth Day of May, 2009

JOHN DOLL  
*Acting Director of the United States Patent and Trademark Office*